(12) United States Patent
Lefebvre

(10) Patent No.: US 7,073,272 B1
(45) Date of Patent: Jul. 11, 2006

(54) RIGID GAUGE FOR TRAILER KINGPIN ASSESSMENT

(76) Inventor: Richard M. Lefebvre, 604 Shady Creek Trail, Mesquite, TX (US) 75126

( * ) Notice: Subject to any disclaimer, the term of this patent is extended or adjusted under 35 U.S.C. 154(b) by 0 days.

(21) Appl. No.: 11/016,151

(22) Filed: Dec. 17, 2004

(51) Int. Cl.
G01B 5/08 (2006.01)

(52) U.S. Cl. ............................. 33/600; 33/1 BB; 33/563

(58) Field of Classification Search ................. 33/600, 33/1 B, 1 BB, 501, 562, 563, 564; D10/64, D10/65
See application file for complete search history.

(56) References Cited

U.S. PATENT DOCUMENTS

| | | | | |
|---|---|---|---|---|
| 1,881,651 A | * | 10/1932 | Franklin | 33/562 |
| 2,684,535 A | * | 7/1954 | Reicherter | 33/562 |
| 3,381,385 A | * | 5/1968 | Wilber | 33/563 |
| D252,451 S | * | 7/1979 | Behnke | D10/64 |
| D273,467 S | * | 4/1984 | Martin | D10/64 |
| 5,189,847 A | * | 3/1993 | Billingsley | 451/358 |
| 6,085,623 A | * | 7/2000 | Lefebvre | 82/128 |
| D429,654 S | * | 8/2000 | Pochurek | D10/64 |

OTHER PUBLICATIONS

The Holland Group, Inc., Holland Service Bulletin XL-SB020 titled "Kingpin Maintenance and Replacement Recommendations", dated Jul. 8, 2004, copyrighted Nov. 2002, 3 pages.*

The Holland Group, Inc., Holland Service Bulletin, "Kingpin Maintenance and Replacement Recommendations", Rev. Jul. 8, 1994, © Jan. 2000, 2 pages.

American Kingpin Specialists, Inc., Kingpin Specialists brochure/flyer, "Why replace when you can repair and save ?" (Note: see paragraph 12 of IDS Tramsmittal.) date unknown.

* cited by examiner

Primary Examiner—R. Alexander Smith
(74) Attorney, Agent, or Firm—Joseph Fischer; Beusse, Wolter, Sanks, Mora & Maire, P.A.

(57) ABSTRACT

A gauge (100) for measuring wear of a trailer kingpin (10) provides, for each of the base (20) and shank (30) parts of a kingpin, two contiguous slots (118 and 120, and 114 and 116, respectively), one slot (118, 114) sized to indicate sufficient wear to warrant scheduling replacement or rebuilding, and the other, more lateral slot (120, 116), sized to indicate failure due to excessive wear. In described embodiments, the two pairs of contiguous slots (118 and 120, 114 and 116) are joined in the middle of the gauge (100) by an entrance area (112). A respective kingpin base (20) or shank (30) that does not pass, at its widest point, from the entrance area (112) into the respective slot (118, 114) has not worn to the point of warranting replacement or rebuilding. Embodiments of the kingpin gauge (100) may also have spaced apart open slots (141, 142) for measuring the length and trueness of a kingpin along its vertical axis (50).

15 Claims, 7 Drawing Sheets

RIGID GAUGE FOR TRAILER KINGPIN ASSESSMENT

FIELD OF INVENTION

The invention is directed to feeler-type gauge apparatuses, and methods, for in-place measurement of wear of trailer kingpins, providing two contiguous notches for each of two diameters of a kingpin to be measured, and thereby providing three possible results with regard to the condition of the respective diameter. Additionally, spaced notches for checking length and squareness of a kingpin are provided in some apparatus embodiments.

BACKGROUND

The most common joining mechanism for tractor trailers in the United States involves the use of a kingpin at the front end of the trailer to connect with the fifth wheel on the tractor. A kingpin inserts into the fifth wheel of a tractor which then, after locking, pulls the trailer across the roads and highways to deliver the goods in the trailer. Essentially all of the trailer weight pulled by the tractor is transferred across the kingpin, so the kingpin is under a great amount of stress. It also is subject to wear. When a kingpin wears beyond a certain point it creates a risk that the trailer will become accidentally disconnected from the tractor. In addition to routine wear, a kingpin may be impacted and thereby angled beyond a desired or allowed tolerance. Excessive wear and/or specific damage present risks of both damage to goods and possible harm to individuals, that is, injury or loss of life.

FIG. 1 provides a side view of a common style of kingpin 10; other styles are known in the art and the differences in style are not known to affect the operation of the present invention. The kingpin 10 typically is secured by welding (welds not shown) of its upper portion 15 onto a solid plate 18 of the trailer (such as a trailer "bolster plate"). Once so installed, the parts of the kingpin 10 viewable from outside the trailer, and those involved with joining to the fifth wheel of a tractor, are: a cylindrical base 20 having a height 25; a cylindrical shank 30 having a height 35; and a cylindrical head 40, which is the bottom-most component of the kingpin 10, having a height 45. In use, the kingpin 10 is vertically oriented, as indicated by vertical axis 50. When in use by insertion into a tractor fifth wheel, the kingpin experiences most wear on shank 30.

The size of kingpins most commonly found in trailers in use in the United States is a nominal 2-inch kingpin. For such a kingpin, the base has a 2.875 inch diameter, the shank has a 2 inch diameter, and the head has a 2.810 inch diameter. A larger, 3-inch nominal size kingpin, is used for certain large equipment trailers.

While replacement of kingpins is known in the art, newer technologies provide for on-site rebuild of kingpins (see, for example, www.kingpinspecialists.com). The advantages of on-site rebuilding include: lower cost; faster turnaround time; and less time and miles driving on the road with an excessively worn kingpin. Whether worn or damaged, a kingpin that has exceeded allowed specifications presents an undesired risk (including violation of regulations and/or guidelines) when that kingpin remains in use on the road, such as to pull a trailer (bearing that kingpin) to a shop for replacement or repair. Consequently, there is a need to accurately and precisely predict the status of wear of a kingpin.

Thus, there is a need to monitor and assess the condition of kingpins by mechanics and other personnel. In the past, this has been done by using gauges of various sorts. For example, a plastic gauge provided by The Holland Group, Inc., (Holland, Mich.) measures both the 2-inch and the 3-inch sizes of kingpins. However, for each of the base and shank diameters, the gauge only indicates whether the respective diameter has worn to the point of needing replacement or rebuilding. That is, it has no provision for indicating that the respective diameter is close to requiring replacement or rebuilding. Also, the plastic is flexible and has been found to deform during use, reducing the accuracy and precision of measurements taken by the Holland gauge. This plastic gauge also has means for measuring the length of the kingpin.

Another gauge is comprised of thin metal and has an opening that provides spaced but converging sides (i.e., a truncated cone, resembling a portion of the two equal sides of an isosceles triangle). The kingpin component is slid between these sides, and measurements provided along the sides are supposed to allow assessment by a user as to the wear status of the kingpin. However, given the grease typically found on a kingpin, and the difficult position of a kingpin, beneath the front section of a trailer, taking such readings accurately and precisely is not easy for this style of gauge. Both the other style of gauges (i.e., plastic with no intermediate notch and the thin metal with triangular groove) have a tendency to stretch or otherwise deform when rotated around an unevenly worn kingpin.

Thus, the present inventor has recognized problems with gauges provided in the industry and has conceived of, and put into practice, a solution to such problems. The present inventor has developed an improved gauge for use by truck drivers, mechanics and other personnel involved in the tractor trailer industry. This gauge provides for more accurate and precise measurements of the various dimensions and components of a trailer kingpin, and also provides for a new, intermediate measurement that provides a result that indicates the kingpin is near a point of wear that would exceed a desired acceptability specification. This allows the user to schedule replacement or rebuild of the kingpin without having to drive with a kingpin that has already gone out of specification (or to take the trailer out of commission until a rebuild or replacement can be scheduled). This is also useful because the more wear there is on the kingpin, the faster the kingpin wears the jaws of the fifth wheel.

DETAILED DESCRIPTION OF THE INVENTION

The present invention is directed to a rigid gauge that provides for more accurate and precise measurements of the various dimensions and components of a trailer kingpin, and that also provides for an intermediate measurement (between "passing" and "failing") that indicates the kingpin is near a point of wear that would exceed the specified limits for wear. This warning of imminent or near-term failure/ falling out of specification allows the user to schedule a rebuild without great inconvenience or risk of driving the trailer on roads when the kingpin is out of specification. Specific embodiments and descriptions of the apparatus and method of the present invention are described below.

As to the rigidity of the gauge, it has been found that solid aluminum plate provides a good balance between weight, hardness, dimension and rigidity. For example, not to be limiting, a gauge of the present invention may be made of aluminum (or an aluminum alloy) of a thickness of 0.25 inches. This thickness also provides for a sufficient lateral contact along one surface when the gauge is being used to measure the length of a kingpin. These and other materials, such as but not limited to metals, metal alloys, plastics, resins, composites, and the like, may be used for the gauge body so long as when fabricated to a desired thickness they form a body of the gauge that is sufficiently rigid to avoid noticeable deformation when a standard level of force is applied to the gauge during kingpin measurement operations. By noticeable deformation is meant that a bending is visibly observed, or a first result along a kingpin component is followed by a second, different result after a user additionally pulls and/or twists the gauge while maintaining the position along the kingpin component.

Figure 2A:
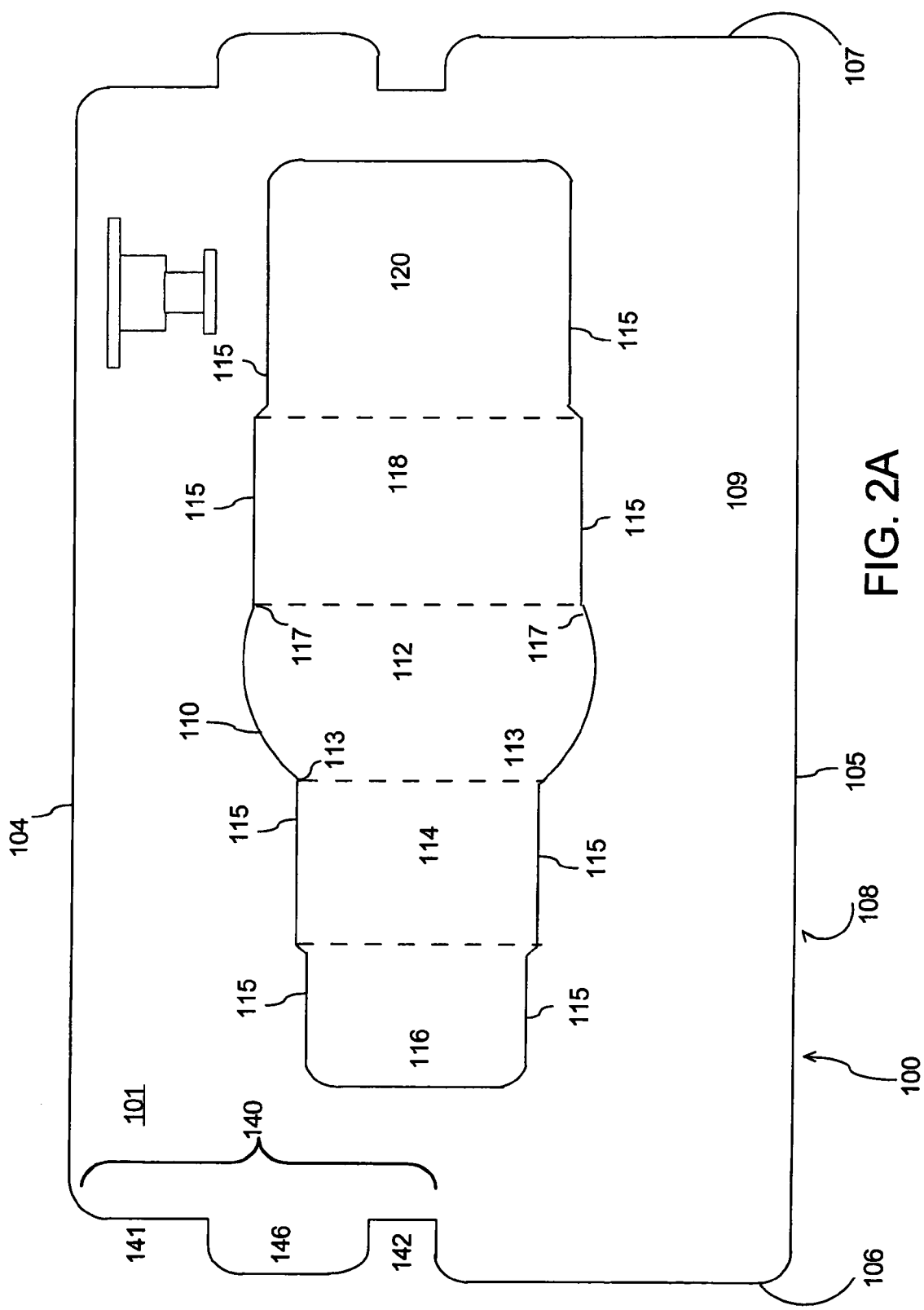
FIG. 2A provides a front view of a kingpin gauge of the present invention.

FIG. 2A exemplifies one embodiment of the present invention. FIG. 2A provides a front view of a kingpin gauge 100 comprising an aluminum body 109 that has a front face 101, a top side 104, a bottom side 105, a left side 106 and a right side 107. A back face 108 is not viewable, however, it is co-planar with the front face 101 and distanced by the thickness of gauge 100 from the front face 101. A gauge opening 110 is centrally positioned in gauge 100 as viewable in FIG. 2A. The gauge opening 110 is a cutout area that provides for measurement of the diameters of the base and of the shank of the kingpin. Centrally located in gauge opening 110 is an entrance area 112 that has a sufficient diameter for entry of a kingpin of a particular size. To one side of entrance area 112 are two contiguous notches (which are also referred to as "slots" in the art), one defining a schedule rebuild zone 114 for the shank of the kingpin and more lateral to zone 114 a more narrow notch defines failure zone 116 for the shank. To an opposite side of the entrance area 112 and contiguous with it are two notches, a first notch defining a schedule rebuild zone 118 for the base of the kingpin and more lateral to zone 118 in the gauge opening 110 a more narrow notch defines failure zone 120 for the base of the kingpin. These zones, 114 and 116, and 118 and 120, which are delineated by dashed lines in addition to the opposing sides 115 of the respective notches, each have a respective width (the distance between respective opposing sides for each zone) to measure the diameter of a kingpin shank and of the kingpin base, respectively. The lengths of the zones 116 and 120 are at least one radius of the respective shank and base, so that the shank and the base may enter the respective zones. Also, it is noted that when two points of the shank (or base) contact opposite sides of one zone (i.e., sides 115 of zone 114), the portion of the shank (or base) disposed laterally (outward) actually extends into the next zone (although this is of no relevance to the measurement within the zone of interest, i.e., the zone being contacted by the two points of the shank (or base)).

Figure 2B:
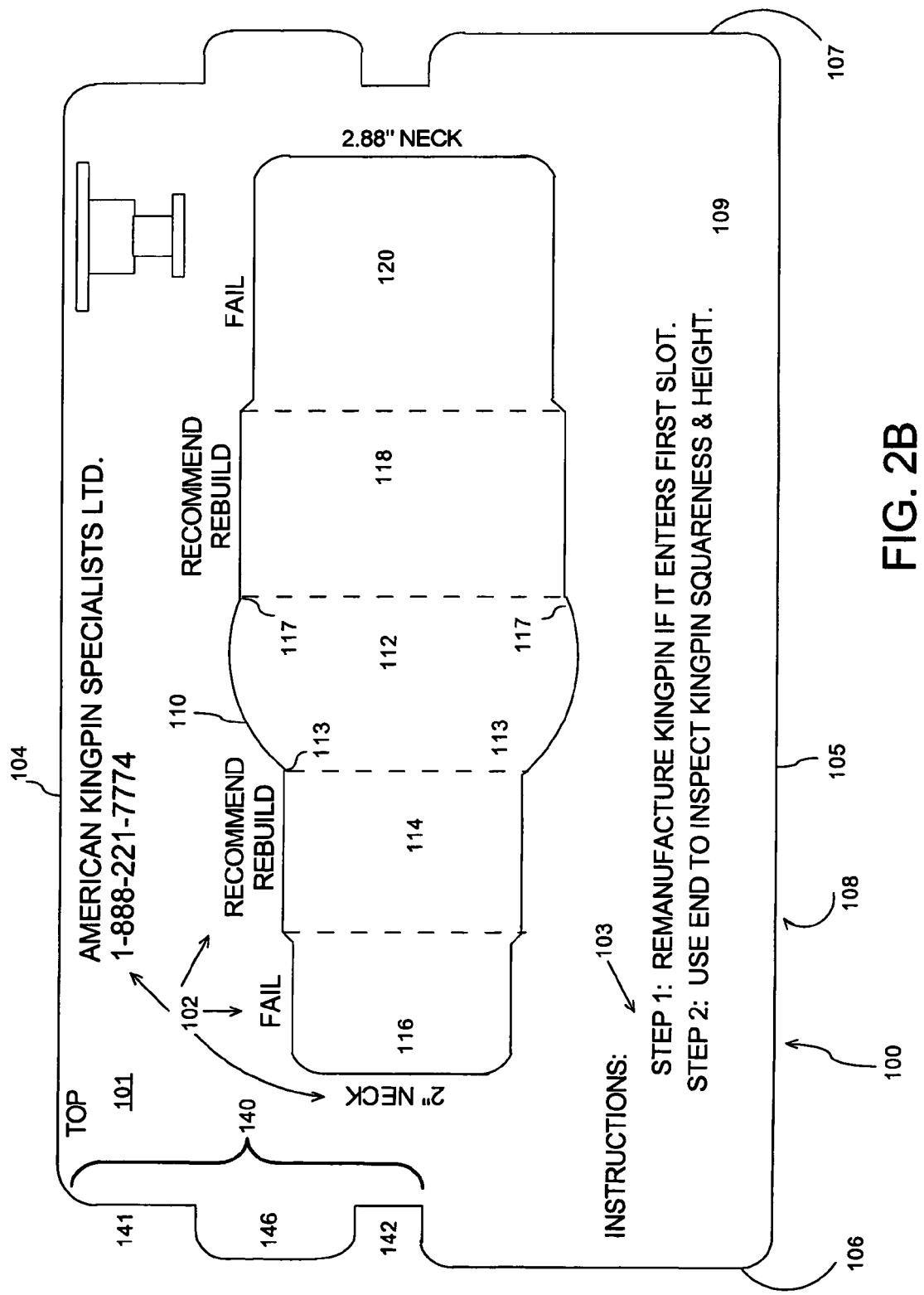
FIG. 2B provides a similar front view, also showing indicia and instructions.

FIG. 2B comprises the same components as the embodiment of FIG. 2A, and additionally comprises relevant indicia 102 and instructions 103. The instructions 103 indicate to the user to "remanufacture kingpin if it enters first slot" (i.e., either of the "recommend rebuild"-labeled zones 114 and 118), and to "use end [i.e., 140] to inspect kingpin squareness & height." The indicia 103 provide additional information as shown, and is not meant to be limiting. The instruction to remanufacture is specific to the present invention, as other gauges in the art lack the relevant intermediate zones (i.e., 114 and 118).

Exemplary operation of this component of the kingpin gauge 100 is described as follows: When a user wishes to measure the wear of a kingpin on a trailer (disengaged from the fifth wheel), the user lifts gauge 100 while the gauge is in a substantially horizontal plane so that the entrance area 112 passes above the head of the kingpin in need of measurement. Then when the gauge 100 is aligned with the shank of the kingpin, the user moves the gauge to one side so as to press the gauge at contact points 113 against a portion of the surface of the shank of the kingpin. If the shank contacting the gauge at those contact points 113 is of sufficient size, even as the user exerts force against the kingpin while rotating the gauge fully around the shank, the kingpin will not pass farther, into schedule rezone build 114. This indicates the shank has an adequate diameter and need not be rebuilt based on this parameter. However, if at those points along the shank that are contacting contact points 113 there is wear beyond a certain amount, then the shank of the kingpin will extend into schedule rebuild zone 114. In order to assess the entire surface of the circumference of the shank, the user rotates gauge 100 in a 360-degree rotation to evaluate the entire shank surface while maintaining a pressure against the shank. If at any point or areas during that rotational travel the shank moves into schedule rebuild zone 114 due to the exerted pull by the user, this indicates a recommendation to schedule a rebuild of the kingpin.

Alternatively, there may be so much wear on the shank of the kingpin that during the 360 degree evaluation rotation the shank moves into failure zone 116. In such case this would indicate excessive wear to the point where the kingpin should be replaced or rebuilt immediately (or before additional use on the road). By conducting such tests the user is aware of this problem and can properly attend to the rebuilding.

Likewise, another step in the method is to move the gauge 100 farther up the kingpin by positioning the entrance area concentrically with the kingpin and moving it upwards sufficiently to be aligned with the base of the kingpin. Then, similarly as described above, for the shank of the kingpin, the user moves the gauge 100 laterally so as to force the base against contact points 117. If after rotating the gauge fully around the base, the base does not enter further, its diameter not passing into schedule rebuild zone 118, this indicates the base has an adequate diameter and need not be rebuilt based on this parameter. If there is wear beyond a certain amount, the base will extend farther than points 117 and will move into schedule rebuild zone 118 for the base. If the level of wear is more extensive, the base will move into the failure zone 120 which, as for failure zone 116, indicates a need for immediate replacement or rebuild of the kingpin. Thus, the present invention provides for three outcomes, one being that the kingpin has acceptable shank and base diameters, one being to schedule rebuild and the third indicating failure of the kingpin.

Figure 1:
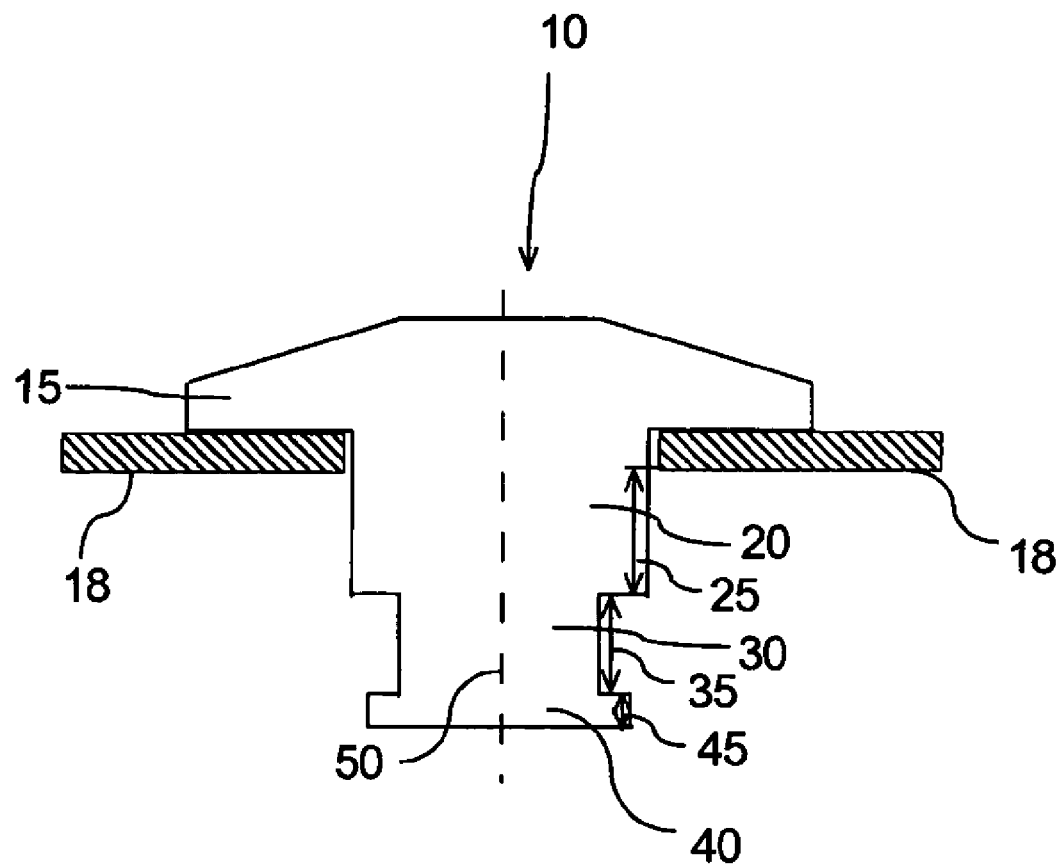
FIG. 1 provides a side schematic view of a kingpin as known in use of the art.

Other parameters measured during typical evaluation of kingpins are the length and the alignment in the vertical axis of the kingpin. Thus, in certain embodiments of the present invention such as depicted in FIG. 2A, a length and trueness feature 140 is comprised of side open notches 141 and 142 separated by protrusion 146. These notches 141 and 142 and the protrusion 146 are dimensioned to fit against the kingpin when slid up to the kingpin along the surface of the trailer upper coupler, bolster, or similar plate. That is, when the top side 104 of gauge 100 is pressed up against the trailer upper coupler or bolster, or analogous plate in the vicinity of the kingpin, by engaging the notches 141 and 142 and protrusion 146 with a side area or a side profile of the kingpin, this assesses additional parameters of the kingpin which include the alignment, i.e., whether the kingpin is square to the plate. That is, the dimension of open notch 141 is adapted to correspond with the height 25 of base 20, the dimension of protrusion 146 is adapted to fit into a space corresponding with the height 35 of shank 30, and the dimension of open notch 142 is adapted to correspond with the height 45 of kingpin head 40 (kingpin features not shown in FIG. 2A, see FIG. 1). In that at times a mechanic improperly installs a new kingpin designed for a different thickness plate than exists on the particular trailer, which results in improper overall external (to the plate) length of the kingpin, the length and trueness feature 140 provides for rapid assessment to determine if the kingpin length is correct or incorrect (i.e., based on such inadvertent mismatch of a kingpin and trailer plate thickness). This assessment indicates a kingpin that has an improper length. If a kingpin has an improper length, that is, if it is too long or too short for fitting into a respective fifth wheel, then the jaws of the fifth wheel do not lock properly onto the kingpin, resulting in a safety hazard and/or additional wear. As for alignment, if the kingpin is far out of true vertical, this may also be determined by eye, by viewing gaps in the fit of the length and trueness feature 140 against the kingpin, or, in extreme cases, if the length and trueness feature 140 does not fit with the features of the kingpin.

Figure 3A:
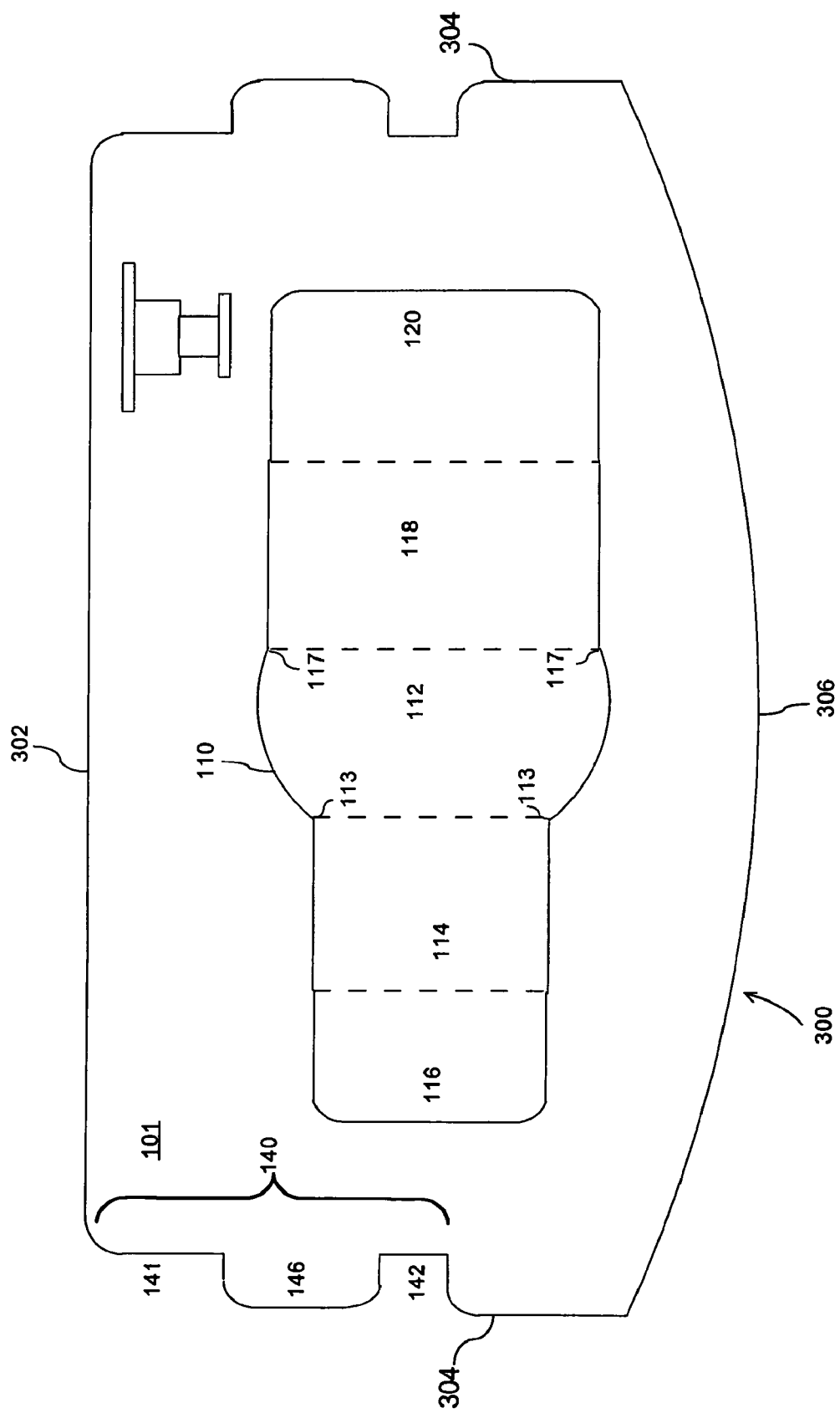
FIG. 3A provides a front view of a kingpin gauge of the present invention having one curvilinear side.
Figure 3B:
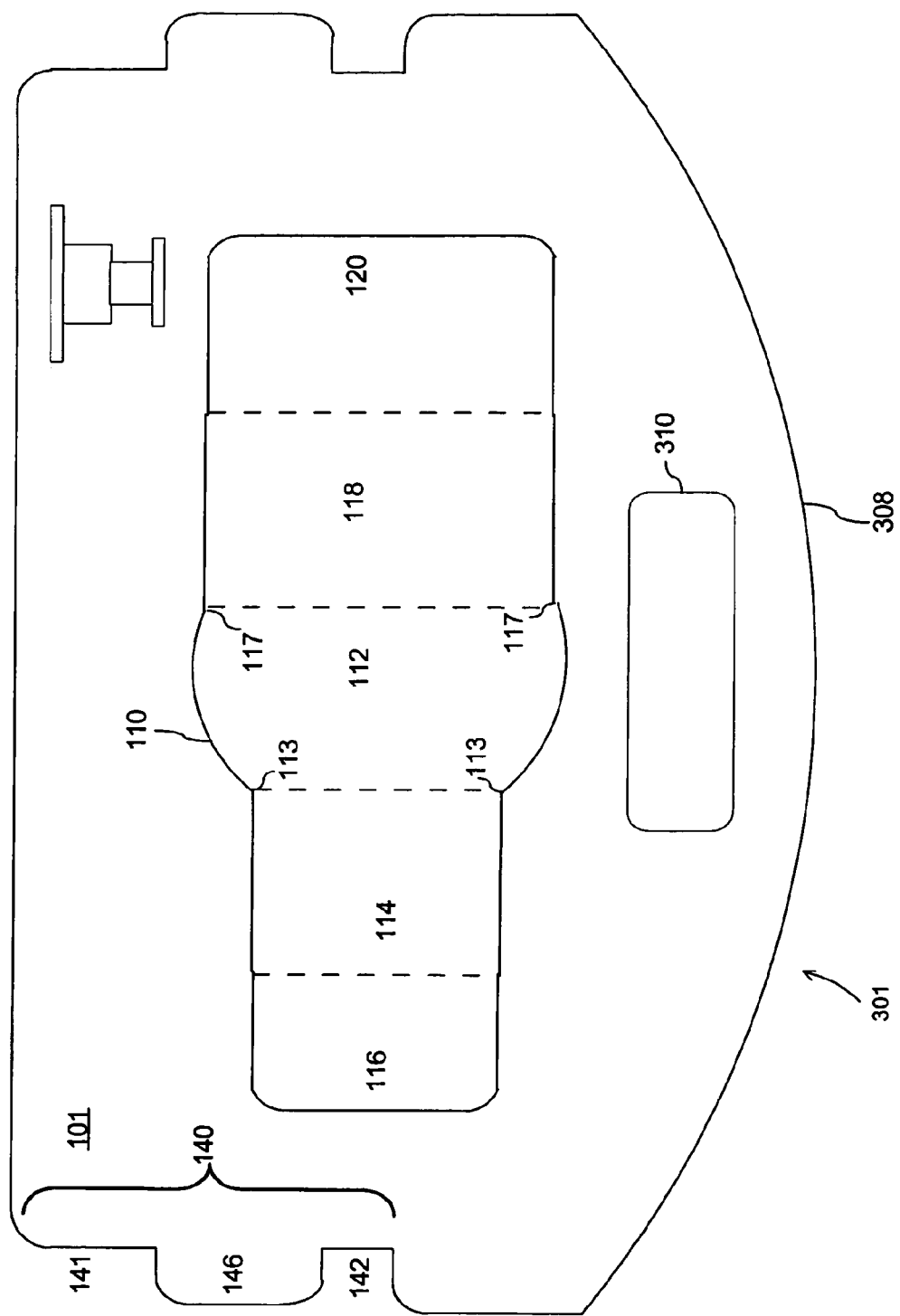
FIG. 3B provides a front view of a kingpin gauge of the present invention having a more pronounced curvilinear side than FIG. 3A, and additionally having a carrying handle.
Figure 3C:
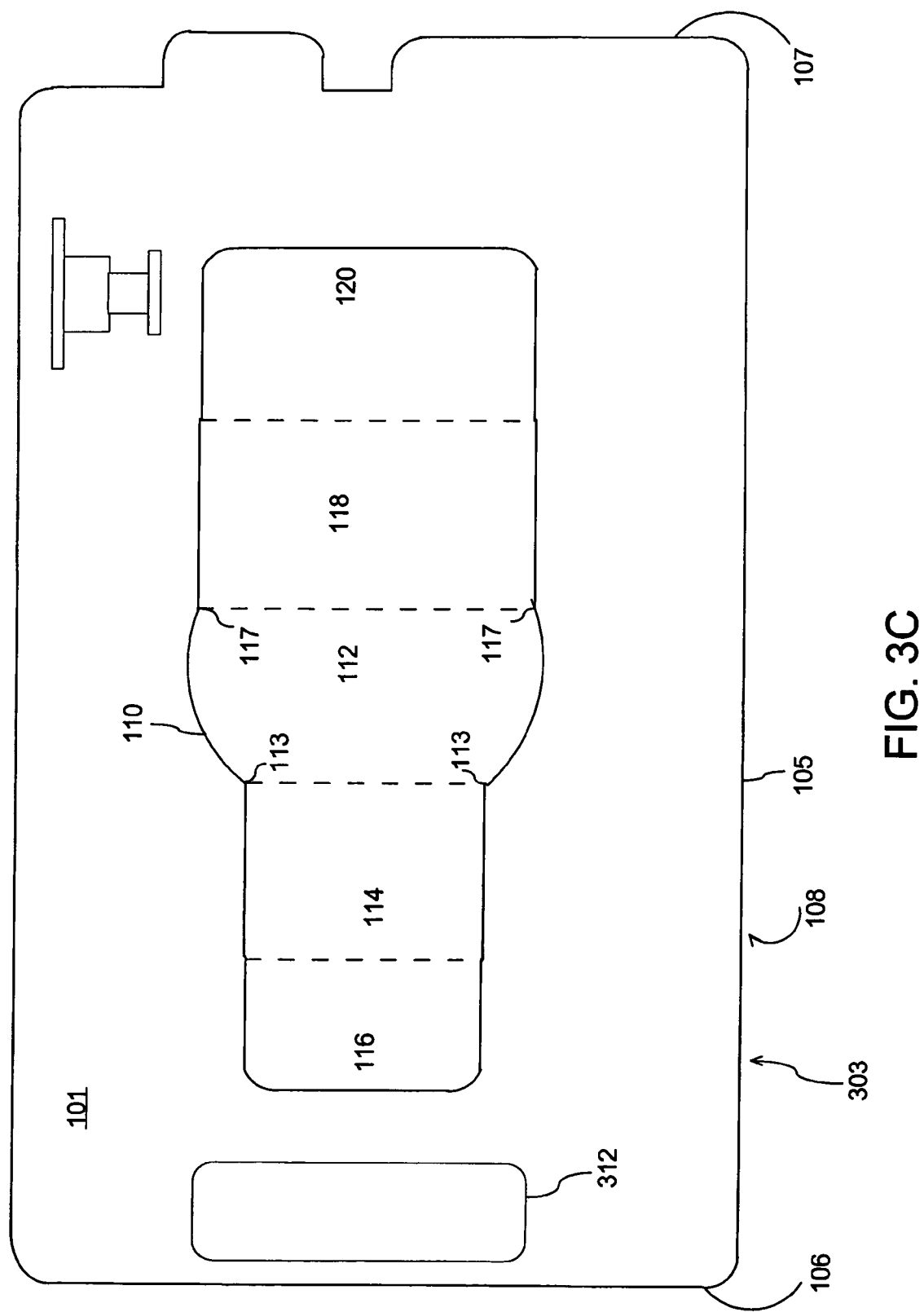
FIG. 3C provides a front view of a kingpin gauge of the present invention, the gauge having a handle on one end for use during assessment.

The present invention need not be shaped as shown in FIG. 2A. For example, not to be limiting, the general shape of a kingpin gauge of the present invention may be as depicted in FIG. 3a. FIG. 3a depicts a kingpin gauge 300 with one straight edge 302, two sides 304 that have largely straight edges (providing space for 140) and then a curvilinear side 306 opposing side 302. FIG. 3b is similar to the design of FIG. 3a, but a gauge 301 has a greater curvilinear arc of side 308 that provides space for a handle 310, which is a cut-out in the gage 100 that provides for ease of carrying. Another design of the present invention, not to be limiting, is FIG. 3c, a front view of which shows a gauge 303 that additionally has a handle 312 lateral to the notches for the shank to assist the user when the user is engaging the gauge opening 110 against the kingpin base. It is noted that although the open area of the kingpin base failure zone 120 is sufficient for use as a handle for many users' hands, this is not the case for the kingpin shank failure zone 116. Thus, the embodiment in FIG. 3c provides a handle 312 to facilitate use when pulling the gauge 303 in the direction of the side having the shank notches (i.e., those defining the respective zones for measuring the shank).

As a specific example of embodiments of the present, a gauge is designed and fabricated using CNC technology on aluminum plate stock having a length of approximately 12 inches, and height of approximately 6 inches, and a nominal thickness of 0.25 inches. The design is similar to the design depicted in FIG. 2A (whose component numbers are used in this paragraph), and the gauge 100 is sized for assessment of a 2-inch kingpin. The entrance area 112 has a diameter of approximately 3.0 inches, the schedule rebuild zone 114 for the shank of the kingpin has a distance (i.e., a width) between its parallel sides of 1.920 inches (i.e., 2.0"–0.080"), and the failure zone 116 has a distance (i.e., a width) between its parallel sides of 1.880 inches (i.e., 2.0"–0.120"). This 1.880 inches, for this example, is referred to as a specification defining a maximum allowed shank wear, in that if a shank enters this zone, it is smaller than this specification and is considered to have exceeded the range for allowable use, and therefore requires replacement. The schedule rebuild zone 118 for the base of the kingpin has a distance (i.e., a width) between its parallel sides of 2.795 inches (i.e., 2.875"–0.080") and the failure zone 120 for the base of the kingpin has a distance (i.e., a width) between its parallel sides of 2.755 inches (i.e., 2.875"–0.120 inches). This 2.755 inches, for this example, is referred to as a specification defining a maximum allowed base wear, in that if a base enters this zone, it is smaller than this specification and is considered to have exceeded the range for allowable use, and therefore requires replacement. Appropriate tolerances are provided for these dimensions. However, with such dimensions the user is advised of the need to rebuild a worn kingpin when about 70% of the allowed wear (to the point of a failing kingpin) is reached. (This is calculated by dividing 0.080 into 0.120, to obtain 66.7 percent.) This specified degree of wear, in part, is related to the increased wear rate of a worn kingpin compared to a new kingpin.

It is noted that the figures are not drawn to scale, and that, in particular, the transitions from one zone to another do not correspond to actual proportions. For example, the transitions from one zone to another in FIGS. 2A and 2B are exaggerated, in order to better exemplify aspects of the invention.

Figure 4:
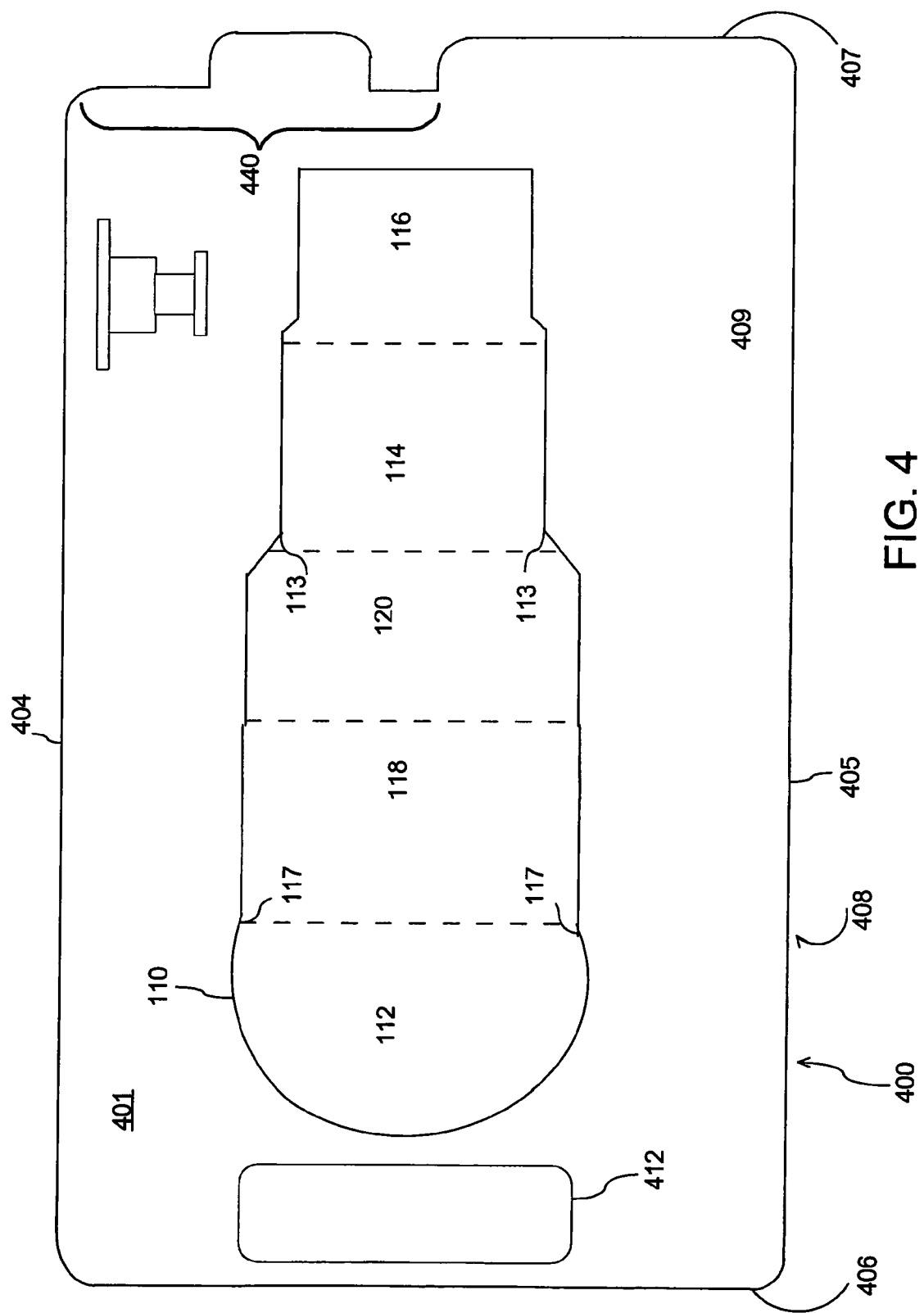
FIG. 4 is a front view of an embodiment of a kingpin gauge that has it opening to one side of four zones for measuring.

FIG. 4 is a front view of another embodiment of the present invention. In FIG. 4, an opening 112 in the body 409 of gauge 400 (the gauge 400 having a front face 401, sides 404, 405, 406 and 407, and back face 408) is not positioned centrally between the zones for the base and the shank, as an analogous entrance zone was so positioned in FIG. 2a (and others). Instead, as observable in FIG. 4, the opening is disposed to one end of four zones 118 and 120 (for a kingpin base), and 114 and 116 (for a kingpin shank). Thus, in operation, a kingpin (not shown in FIG. 4) is inserted into the opening 112, aligned to the kingpin base (not shown in FIG. 4), and the gauge 400 is pulled sideways so the kingpin base either contacts the points 117 (thus, after a 360-degree rotation to contact the circumference of the base against contact points 117, "passing" the diameter measurement test), or enters recommend rebuild zone 118. If on further moving sideways the diameter of the kingpin base contacts but does not enter failure zone 120, and this status is maintained during a 360-degree rotation, whilst applying pressure to move the kingpin base into failure zone 120, then the measurement test indicates a "recommend rebuild." If, however, the diameter of the kingpin base enters failure zone 120, then this indicates a failure measurement for the kingpin. A second testing is conducted on the kingpin shank (not shown in FIG. 4). The kingpin shank is aligned with the gauge 400 (which is in a horizontal plane relative to the vertical axis of the kingpin) and the gauge 400 is pulled sideways so the kingpin shank either contacts the points 113 (thus, after a 360-degree rotation to contact the circumference of the shank against contact points 113, "passing" the diameter measurement test), or enters recommend rebuild zone 114. If on further moving sideways the diameter of the kingpin shank contacts but does not enter failure zone 116, and this status is maintained during a 360-degree rotation, whilst applying pressure to move the kingpin shank into failure zone 116, then the measurement test indicates a "recommend rebuild." If, however, the diameter of the kingpin base enters failure zone 116, then this indicates a failure measurement for the kingpin. In this and previous examples, by referring to the "diameter" of the kingpin base and shank is meant the diameter that is perpendicular to the sides of the notches that define the zones. It is this "diameter" that is referred to when referring to a base or shank "entering" a zone.

Gauge 400 also comprises a length and trueness feature 440 that operates as described for the embodiment of FIG. 2A above. The embodiment depicted in FIG. 4 lends itself to pulling from one side 406 of the gauge 400, and also to providing a handle 412 to assist in this pulling from one end. However, other styles of this type of embodiment may be fabricated that do not have a handle such as 412. Likewise, the style variations in FIGS. 3A–C may be adapted to embodiments that have the opening at one end of the four zones, as depicted in FIG. 4 and described above.

With regard to the methods of operation, such as described above, it is noted that, given wear on some kingpins that is concentrated to certain areas, there are times when an attempt to rotate a gauge of the present invention in a full 360-degree circle around a base or a shank of the kingpin ends upon encountering such a worn area. At such time the base or shank may enter the next notch/zone, and there be restricted from further rotation by the smaller dimension in that notch/zone. In such circumstances, a full 360-degree rotation is not part of the method. As indicated, a user may back the base or shank out of the notch/zone which it entered, and continue the rotation to determine if there are even more worn areas along the respective circumferences of the base or shank. Thus, there are variations in the steps of methods of use of the apparatus of the present invention that depend, in part, on the wear pattern of the kingpin being measured.

In other embodiments, the difference between the new specified diameter of the shank or base and the width of the respective "schedule rebuild zone" is set to provide a range of specified allowed wear between about 45 and about 90 percent of the maximum allowed wear (i.e., the width of the failure zone, or the "failure" specification). In certain of these embodiments, the difference is between about 50 and about 80 percent of the maximum allowed wear, and in certain of these embodiments, the difference is between about 60 and about 70 percent of the maximum allowed wear.

Also, the above example is not meant to indicate that the respective opposing sides of the notches (i.e., zones 114, 116, 118 and 120) must be parallel. However, this has been determined by the inventor to represent the best mode of practice. Embodiments may be manufactured with slight angling of the respective sides of the notches, to deviate from a true parallel relationship, and still be within the scope of the present invention. A zone formed with notches that have parallel sides to form the respective zone, or a zone formed from an angling of one or more of the two sides that define the zone, are considered within the scope of a "means for measuring" as that term is employed herein, including the claims.

Also, embodiments of the present invention may be made and used that do not have the notches and protrusion (i.e., see 142 of FIG. 2A) for assessment of the length and trueness of a kingpin. That is, a gauge may be fabricated without these features. Without being limiting, this may occur when a separate gauge or other device is used to assess length and trueness along the kingpin vertical axis.

Based on the above, it is apparent that the "schedule rebuild" zones allow the owner to schedule maintenance before the trailer is fully out of surface. The average time to replace an upper coupler assembly is three days on refrigerated trailer and dry vans. It takes about three weeks to order the parts and get them in and the cost ranges from about $2–3,000 plus expensive down time. By use of this gauge in conjunction with a scheduled maintenance program, excessive wear on the fifth wheel also is reduced, as are chances of developing cracks in the bolster plate.

Also if a user is considering replacing fifth wheel because of excess banging from the fifth wheel and the kingpin, gauges of the present invention provide relevant information as to whether the kingpin is approaching the fail mark. This can save the customer from spending money on parts that are not worn.

While certain embodiments of the present invention have been shown and described herein in the present context, such embodiments are provided by way of example only, and not of limitation. Numerous variations, changes and substitutions will occur to those skilled in the art without departing from the invention herein. For example, the present invention need not be limited to best mode disclosed herein, since other applications can equally benefit from the teachings of the present invention. Accordingly, it is intended that the invention be limited only by the spirit and scope of the appended claims.

What is claimed is:

1. A gauge for assessing wear of a base and a shank of a trailer kingpin, the gauge comprising:
   a. a body sufficiently rigid to avoid noticeable deformation during measurements of said kingpin, the body comprising a front face, a back face, and sides; and
   b. an opening in said body passing from said front face to said back face, the opening comprising:
      i. a centrally disposed entrance area sized for entry of said kingpin;
      ii. to a first side of said centrally disposed area, a first notch sized to indicate a first specified degree of wear of the shank;
      iii. contiguous with said first notch, a second notch sized to indicate a second specified degree of wear of the shank, the adjacent arrangement of the first notch and the second notch capable of selected intermediate measurement of wear of the shank;
      iv. to an opposing side of said centrally disposed area, a third notch sized to indicate a first specified degree of wear of the base; and
      v. contiguous with said third notch, a fourth notch sized to indicate a second specified degree of wear of the base, the adjacent arrangement of the third notch and the fourth notch capable of selected intermediate measurement of the wear of the base.

2. The gauge of claim 1, additionally comprising a length and trueness feature comprising a first open notch having a length corresponding to a height of a base of the kingpin, a second open notch aligned with the first notch, separated by a protrusion having a length corresponding to a height of a shank of the kingpin, the second open notch having a height corresponding to a height of a head of the kingpin, the protrusion comprising top and bottom edges sized to indicate a desired tolerance of axial trueness, whereby a particular kingpin having an axial deviation exceeding the desired tolerance cannot enter the length and trueness feature.

3. The gauge of claim 1, wherein the first specified degree of wear of the shank and the first specified degree of wear of the base each are set to between about 45 percent and about 90 percent of a respective specification defining a maximum allowed wear.

4. The gauge of claim 1, wherein the first specified degree of wear of the shank and the first specified degree of wear of the base each are set to between about 50 percent and about 80 percent of a respective specification defining a maximum allowed wear.

5. The gauge of claim 1, wherein the first specified degree of wear of the shank and the first specified degree of wear of the base each are set to between about 60 percent and about 70 percent of a respective specification defining a maximum allowed wear.

6. The gauge of claim 1, wherein the first specified degree of wear of the shank and the first specified degree of wear of the base each are set to about 70 percent of a respective specification defining a maximum allowed wear.

7. A gauge for assessing wear of a base and a shank of a trailer kingpin, the gauge comprising:
   a. a rigid body comprising a front face, a back face, and sides; and
   b. an opening in said body passing from said front face to said back face, the opening comprising:
      i. a centrally disposed entrance area sized for entry of said kingpin;
      ii. a first means for measuring a first specified degree of wear of the shank indicating a need to replace or rebuild the kingpin;
      iii. contiguous with said first means for measuring, a second means for measuring a second specified degree of wear of the shank indicating the kingpin has exceeded a specification defining a maximum allowed shank wear;
      iv. to an opposing side of said centrally disposed area, a third means for measuring a first specified degree of wear of the base indicating a need to replace or rebuild the kingpin; and
      v. contiguous with said third means for measuring, a fourth means for measuring a second specified degree of wear of the base indicating the kingpin has exceeded a specification defining a maximum allowed base wear.

8. The gauge of claim 7, wherein the first specified degree of wear of the shank and the first specified degree of wear of the base each are set to between about 45 percent and about 90 percent of the respective specification defining a maximum allowed wear.

9. The gauge of claim 7, wherein the first specified degree of wear of the shank and the first specified degree of wear of the base each are set to between about 50 percent and about 80 percent of the respective specification defining a maximum allowed wear.

10. The gauge of claim 7, wherein the first specified degree of wear of the shank and the first specified degree of wear of the base each are set to between about 60 percent and about 70 percent of the respective specification defining a maximum allowed wear.

11. The gauge of claim 7, wherein the first specified degree of wear of the shank and the first specified degree of wear of the base each are set to about 70 percent of the respective specification defining a maximum allowed wear.

12. A gauge for assessing wear of a base and a shank of a trailer kingpin, the gauge comprising:
    a. a body comprising a front face, a back face, and sides; and
    b. an opening in said body passing from said front face to said back face, the opening comprising:
       i. an entrance area sized for entry of said kingpin;
       ii. contiguous with said entrance area, a first means for measuring a first specified degree of wear of the base indicating a need to replace or rebuild the kingpin;
       iii. contiguous with said first means for measuring, a second means for measuring a second specified degree of wear of the base indicating the kingpin has exceeded a specification defining a maximum allowed base wear;
       iv. contiguous with said second means for measuring, a third means for measuring a first specified degree of wear of the shank indicating a need to replace or rebuild the kingpin; and
       v. contiguous with said third means for measuring, a fourth means for measuring a second specified degree of wear of the shank indicating the kingpin has exceeded a specification defining a maximum allowed shank wear.

13. The gauge of claim 12, additionally comprising a length and trueness feature comprising a first open notch having a length corresponding to a height of a base of the kingpin, a second open notch aligned with the first notch, separated by a protrusion having a length corresponding to a height of a shank of the kingpin, the second open notch having a height corresponding to a height of a head of the kingpin, the protrusion comprising top and bottom edges sized to indicate a desired tolerance of axial trueness, whereby a particular kingpin having an axial deviation exceeding the desired tolerance cannot enter the length and trueness feature.

14. The gauge of claim 12, wherein each of the first means for measuring, the second means for measuring, the third means for measuring, and the fourth means for measuring is comprised of a notch having parallel sides defining a desired width.

15. A method of measuring desired wear parameters of a kingpin, comprising:
    a. providing a gauge, the gauge comprising a front face, a back face, and sides, and a centrally disposed entrance area sized for entry of the kingpin, the entrance area contiguous with 1) a first zone, defined by a first notch, sized to indicate kingpin replacement or rebuilding based on a level of wear on a shank of the kingpin, the first zone itself contiguous with a more lateral second zone, defined by a second notch, sized to indicate the kingpin shank has exceeded a shank wear specification, and 2) a third zone, defined by a third notch, sized to indicate kingpin replacement or rebuilding based on a level of wear on a base of the kingpin, the third zone itself contiguous with a more lateral fourth zone, defined by a fourth notch, sized to indicate the kingpin base has exceeded a base wear specification;
    b. aligning the gauge perpendicularly to the kingpin, with the shank within the entrance area;
    c. pulling the gauge to one side to contact the first zone with the shank;
    d. rotating the gauge while maintaining the pulling of step "c";

e. if the shank enters the first zone, pulling the gauge to contact the second zone with the shank and rotating the gauge while maintaining the pulling of step "e";
f. assessing the status of the kingpin based on how far the shank advanced into the first and second zones;
g. aligning the gauge perpendicularly to the kingpin, with the base within the entrance area;
h. pulling the gauge to one side to contact the third zone with the base;
i. rotating the gauge while maintaining the pulling of step "h";
j. if the base enters the third zone, pulling the gauge to contact the fourth zone with the base, and rotating the gauge while maintaining the pulling of stop "j"; and
k. assessing the status of the kingpin based on how far the base advanced into the third and fourth zones.

* * * * *